UNITED STATES PATENT OFFICE.

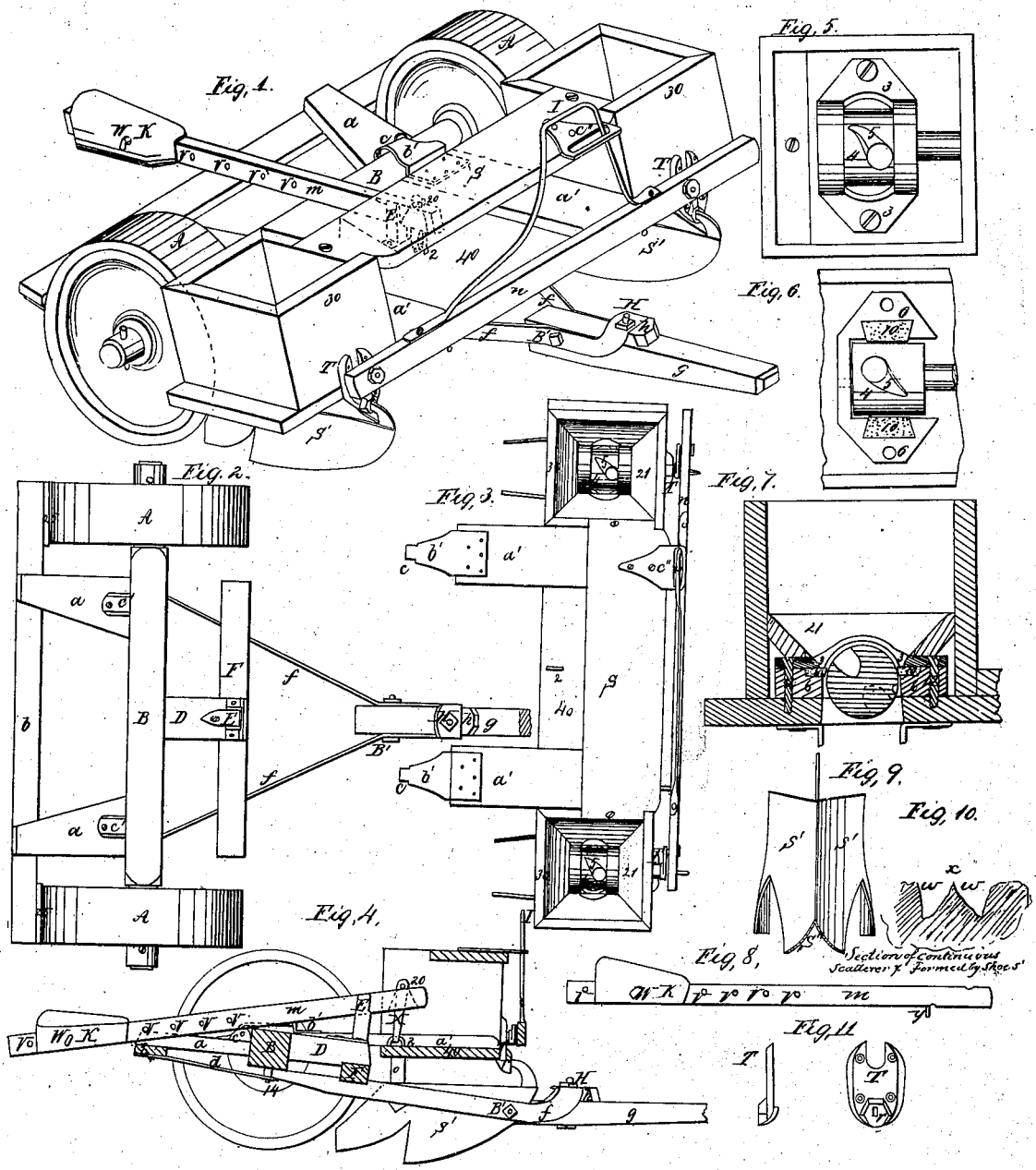

A. W. BRINKERHOFF, OF UPPER SANDUSKY, OHIO.

IMPROVEMENT IN CORN-PLANTERS.

Specification forming part of Letters Patent No. 36,335, dated September 2, 1862.

*To all whom it may concern:*

Be it known that I, A. W. BRINKERHOFF, of Upper Sandusky, county of Wyandot, and State of Ohio, have invented new and useful Improvements in Corn-Planters; and I do hereby declare that the following is a full, clear, and exact description thereof, reference being had to the accompanying drawings, and to the letters of reference marked thereon, in which—

Figure 1 is a perspective view of the whole machine as seen when in use. Fig. 2 is a top view of the main frame-work. Fig. 3 is a top view of the additional frame-work, containing seeding devices, shoes, and attendant's seat. Fig. 4 is a side view, showing the position of weighted lever, shoes, &c., when not in operation and the shoes above the ground. Fig. 5 is a top view of seeding-cylinder provided with its transverse grooves and metallic cap. Fig. 6 is a top view of seeding-cylinder, with its metallic base provided with its place of support for the inner end of the shaft and cavities for the elastic cut-off. Fig. 7 is an end sectional view of cylinder, metallic base and cap, hopper, and elastic cut-off. Fig. 8 is a side view of weighted lever. Fig. 9 is a front view of shoe S′, showing the opening S″ for forming the double furrow and scatterer. Fig. 10 is a sectional view of double furrows $w$ $w$ and scatterers $x$.

The nature of invention consists in that peculiar construction of corn-planters whereby I can combine with the main frame-work, which is used for marking the ground preparatory to planting, an additional or upper frame-work containing the shoes, seeding devices, and attendant's seat, and again remove the same therefrom without in the least impairing either of the parts; also, in so combining with the upper or additional frame-work a weighted lever for the purpose of producing the automatic elevation of the additional frame-work, and keeping the same above the ground at all times, except when mounted by the attendant, thereby dispensing with the necessity of a second attendant for that purpose; also, in providing the seeding-cylinder with oblique grooves to insure an even and certain supply of seed at each operation of the shaft, and also with the elastic cut-off between the metallic base and cap, which may, by means of the screws 12 12, Fig. 7, passing through said base and cap, be forced up to or made to recede from the cylinder, as desired.

To enable others to make and use my invention, I will proceed to describe its construction and operation.

The main frame, Fig. 2, is supported upon two wheels, A A, the distance between whose centers is made to correspond to that between the centers of the seeding-cylinders, and consequently the proper distance apart for the desired width between the rows of corn. Said frame-work consists of axle B, through which horizontally, near each end of its square part, and also directly in the center, are mortises to receive the projecting arms $a$ $a$ and D.

To the outer ends of arms $a$ $a$ and to their under side is attached scraper-bar $b$, and to the under side of this bar are scrapers 25 25. On arms $a$ $a$, and directly in the rear of axle B, are ears $c'$ $c'$, to which eyes $c$ $c$, Fig. 3, are attached by bolts, as seen at $c$ in Figs. 1 and 4. Hounds $f$ $f$, with the forward end turned upward sufficiently high to receive the tongue $g$, and the sides rearward running parallel with each other and sufficiently far apart for the desired width of the tongue as far as B′, Figs. 1, 2, and 4, and then diverging rearward, as shown in Fig. 2, the whole being constructed of one piece of wrought-iron, are attached firmly to the under side of axle B by bolts, as shown at 14, Fig. 4.

Parallel with axle B is placed cross-bar F, slightly notched below to receive the hounds, thereby preventing them from becoming bent or spread apart, while at the same time it affords the place of support for arm D, on the point of which is the fulcrum E for weighted lever M. The tongue is secured to hounds $f$ $f$ by means of bolt B′, while between the point of hounds $f$ $f$ and tongue $g$ is placed slide $h$, with rests at different heights to regulate the depth, while set-screws H hold all firmly together.

The upper or additional frame-work, Fig. 3, is composed of bed-piece 40, of any length desired, for the width between the rows of corn. On each end of this bed-piece are placed the boxes 30 30 for the seed to be planted. Between the seed-boxes and against their inner sides and firmly bolted to bed-piece 40 are arms or cross-pieces $a'$ $a'$. To the outer ends of these arms are attached metallic plates $b'$ $b'$, with eyes at $c$ $c$, as seen in Figs. 1 and 4, to receive the bolts connecting them with the main frame-work at $c'$ $c'$. Near the center of bed-piece 40 is placed a link or eye, 2, as seen in Figs. 1, 3, and 4, for the reception of pendent hook $x$ of weighted lever $m$. To the front edge of bed-piece 40, are firmly attached the metallic plates T T at the proper places to receive the shafts of cylinders 4 4. This plate has on its inner face projections, between which fits tightly bed-piece 40, while in its lower part is a cavity or slot to receive the neck of shoe S', as seen in Figs. 1 and 4, at $r$. The upper portions of plates T T are divided deep enough to allow the shaft of cylinders 4 4 to sink to a proper level or position, and thereby perform the office of otherwise necessary metallic boxings or bearings, while into each of the sides of those plates screws are passed into the seed-boxes, holding them firmly to their places. Those plates therefore perform the several offices of receiving and firmly holding the necks of the shoes, receiving and holding at their proper places the cylinder-shafts, and afford a firm attachment for the seed-boxes. Handle I, connected with shaft $n$, and that with the cranks on the cylinder-shafts, affords the means of operating the cylinders, when desired, while plate $c''$, attached to the top of the attendant's seat $s$, holds handle I in position.

The attendant's seat occupies a position between and is firmly attached to the tops of seed-boxes 30 30. The shoes S' are attached to the under side of bed-piece 40 by means of metallic plates T T, as shown at $r$, Figs. 1 and 4, and by bolts through hanging stirrup $o$, Fig. 4, and are no support to the frame-work whatever while in use, as the whole is supported mainly upon the main frame-work and very slightly upon the horses' necks. Their construction is as follows: Two plates of steel, with expanding wings for coverers in the rear of their centers, and with upward inclining front edges, are firmly welded together from their upper points to within about two inches of their lower edges, from which lower point of welding they gradually recede from each other, thereby forming an inverted-V-shaped opening in the lower front part of the shoe $s'$, as shown at S'', Fig. 9, for the purpose of forming the double furrow, as shown at $w$ $w$, Fig. 10, to receive the seed in a scattered condition. As the seed falls from the boxes upon the continuous scatterer $x$, Fig. 10, it is divided by its point and rolls down the sides into the different furrows and is there covered, thus affording room for the growth of the stalks without crowding each other.

Shoes closed to the bottom are very liable to become choked or clogged, and thereby inoperative, without the knowledge of the operator; but with the herein-described opening in their lower parts that becomes impossible, because as the shoe moves forward the earth forcing in it opening S'' removes all adhering matter from within, keeping all clear and free.

The inner or short end of the shaft of cylinder 4 enters a hole or bearing prepared for it in the metallic base 6 6, as seen in Fig. 6, which metallic base is also provided with recesses at each side of the cylinder 4, Fig. 6. Into each of these cavities or recesses is fitted a piece of rubber or other elastic substance or material, somewhat thicker than the depth of the cavity, as shown at 10 10, Fig. 6. Upon this is placed metallic cap 3 3, Fig. 6, and held in proper position by screws passing through into bed-piece 40. As the screws are tightened or loosened the rubber is forced toward or recedes from cylinder 4, until occupying the position desired, as shown in Fig. 7. Fitted to cap 3 3 is a dish or hopper, for the purpose of feeding out all the seed in the box, as shown at 21, Figs. 3 and 7. This dish or hopper is so placed upon the cap 3 3 within the seed-box as to allow of its easy removal at any desired time. Cylinders 4 are provided with seed-cells at opposite sides and at opposite ends from the center, so that thereby they may be provided with oblique grooves 5, Figs. 3, 5, and 6, for the purpose of agitating the seed in the boxes and feeding it into the seed-cells with certainty. These grooves are made deep at their lower sides and gradually diminish in depth as they approach the center of the cylinder, the lower wall of the groove being nearly perpendicular, thereby making a sharp edge nearly across the face of the cylinder to agitate the seed, said groove at the same time gradually deepening from the point toward the seed-cell. As bar $n$ is actuated by the attendant the cells rise above the elastic cut-off. The wall of the groove, as it rises point first, meets with resistance from weight of seed above, agitates it, and by the continued upward motion it (the seed) is forced down the groove into the cell, thereby effectually filling the cell with equal amounts or quantities of seed. The cylinders are then moved in the opposite direction, when (the upper side of the groove having a plain or smooth surface) the seed is gradually removed by the elastic cut-off and the amount only in the cells deposited in the earth.

Lever $m$, Fig. 8, is provided with an inverted-V-shaped mortise, to allow play as the lever ascends and descends for the flexible hook $x$, Figs. 1 and 4. The under side of the lever is also provided with a shallow groove where it rests on the fulcrum, and a pin, $y$, immediately behind it, to prevent it from slipping forward as the rear end of the lever rises from the weight of the attendant upon the additional frame-work. Said lever is also provided with a sliding weight and various holes, V, that the weight may be confined by bolt W at any desired place. It is very evident that when the boxes are full of seed it will be necessary to remove the weight K nearer the end to elevate the shoes above the ground, and as the seed gradually decreases in amount to move it inward, so that it may be the more easily raised by the attendant on the machine and the shoes be the more easily held in uniform position.

The operation of this machine is as follows, viz: In marking the ground the first way, preparatory to planting, the upper or additional frame-work, Fig. 3, and lever, Fig. 8, are removed from the machine, and the main framework alone used in marking the ground, thereby furnishing a light and convenient marker, and saving the wear of the other portions of the machine. When the ground is prepared the parts removed are again added and the machine occupies the position shown in Fig. 4, which position it maintains at all times when not under the weight of the attendant on seat S. When the attendant is mounted upon seat S, then the bed-piece 40, Fig. 4, is forced down upon hounds $f$ and there held, producing perfect uniformity of depth in planting, which depth may be varied, as desired, by moving slide $h$ so that the hounds may rest on higher or lower notches thereof. In passing over the previously-made marks the attendant, having hold of handle I, gives the cylinders a half-revolution by actuating the shaft $n$ just as the front of shoe S' strikes the cross-mark upon the ground, thereby depositing the seed in check-rows, as desired. In meeting obstructions or turning around at the ends the attendant need not dismount, but by placing his feet upon parts of the lower or main frame, and thereby easing the additional frame-work of his weight, the shoes will rise up and pass over intervening obstructions in its passage. In transporting the machine from place to place no person need be mounted upon it to elevate the shoes above ground.

Having thus fully explained the nature, construction, and operation of my invention, what I claim, and desire to secure by Letters Patent of the United States, is—

1. So constructing the main frame-work of corn-planting machines as that an additional frame-work, combining the seeding devices, shoes, attendant's seat, and elevating-lever, may be placed and carried thereon, substantially as described, and for the purposes set forth.

2. So combining with the main frame-work of corn-planting machines an additional frame-work containing the seeding devices, shoes, and attendant's seat, all of which are forward of the center of the wheels or ground supports, the whole supported and carried on the main frame-work, and so that said additional or upper frame-work may be either added or removed to or from the main frame-work without in the least degree disarranging any of their parts, substantially as and for the purposes set forth.

3. So constructing corn-planting machines as that the shoes or furrow-openers shall at all times, when relieved of the weight of the attendant and without manipulation, be raised above the ground by the weighted lever M, and there carried, as and for the purposes set forth.

4. So constructing corn-planting machines as that the weight of the attendant who operates the seeding mechanism is necessary to and will force the additional frame-work, to which the shoes are attached, down upon the main frame-work, thereby causing them to penetrate the earth to a certain and uniform depth at all times, producing uniformity in the depth of planting, which may be varied, as desired, by notched slide $h$, as set forth.

5. So constructing corn-planting machines as that the attendant or person who operates the seeding mechanism may, by placing his feet upon the lower or main frame-work and gradually rising, relieve the additional or upper frame-work of his weight, thereby allowing the shoes to rise above the ground for the purpose of turning at the ends of the fields and passing over intervening obstacles without the assistance of a second attendant or the necessity of dismounting, as set forth.

6. Hinged or yielding joints "between the point of the tongue and the rear part of the machine," or "between the main points of support," in "combination with seed-planting machines the front part of which is supported on not less than two shoes or runners, and the rear part on not less than two wheels," are old and well-known devices, and therefore I do not claim such joint irrespective of the mechanism herein described; but I do claim, in combination with corn-planting machines supported mainly upon not less than two wheels and slightly upon the horses' necks, and with its seeding devices forward of the center of the wheels, and which are elevated automatically, a hinged or yielding joint in the rear of all points of support, as described, and for the purpose set forth.

7. In seed-planting machines, the automatic elevation of the shoes or furrow-openers above the ground for the purpose of passing intervening obstacles, turning around, and transporting the machine from place to place, as set forth.

8. In combination with a corn-planting machine wherein that portion of the frame-work containing the seeding devices is elevated automatically, and having its seeding devices forward of the center of the wheels, the so connecting the parts between the main and additional frame-work as that by simply removing the bolts at $c\,c$, Figs. 1 and 4, the additional frame-work may be removed, leaving the main frame-work perfect for marking the ground preparatory to planting, as set forth.

9. The weighted lever M, or its equivalent, in combination with the additional frame-work, as and for the purposes set forth.

10. The weight K on lever M, adjustable when used in combination with seed-planting machines, for the purpose of accommodating it to the amount of seed in the boxes and varying weights of attendants, as set forth.

11. In combination with corn-planting machines, the metallic plates T T, constructed as described, forming a receptacle for the neck of shoe S', the bearing for the shaft of cylinder 4, and a ready and firm attachment for seed-boxes 30 30, as set forth.

12. In combination with corn-planting machines, the hounds $f f$, when constructed as described, thereby saving all necessity for wood and bolts in their manufacture.

13. The combination and arrangement of cylinder 4 with metallic base 6 6, and metallic cap 3 3, elastic cut-off 10 10, and dish or hopper 21, as and for the purposes set forth.

14. I do not claim grooves such as may be found or as used in semi-rotating or other slides, as such is not my invention; but I do claim providing the face of cylinders of seed-planters with oblique grooves, in combination with seed-cells, substantially as described, and for the purposes set forth.

15. The formation, by seed-planting machines, of the double furrows $w w$, Fig. 10, with the continuous scatterer $x$ between them, as described, and for the purposes set forth.

16. The inverted-V-shaped opening in the lower front part of shoe S', or its equivalent, for the purpose of forming the double furrows and continuous scatterer, and to prevent the shoe from becoming clogged, as set forth.

A. W. BRINKERHOFF.

Witnesses:
W. H. KIRBY,
LEWIS A. BRUNNER.